US00RE34860E

United States Patent [19]

Skibsted

[11] E Patent Number: Re. 34,860

[45] Reissued Date of Patent: Feb. 14, 1995

[54] ROADWAY CONDITIONING APPARATUS

[76] Inventor: Eric T. Skibsted, P.O. Box 696, Rosebud, Alberta, Canada, T0N 2T0

[21] Appl. No.: 177,341

[22] Filed: Jan. 4, 1994

Related U.S. Patent Documents

Reissue of:

[64] Patent No.: 5,197,820
Issued: Mar. 30, 1993
Appl. No.: 872,145
Filed: Apr. 22, 1992

U.S. Applications:

[63] Continuation of Ser. No. 639,350, Jan. 10, 1991, Pat. No. 5,108,221.

[30] Foreign Application Priority Data

Nov. 9, 1990 [CA] Canada ..... 2029695

[51] Int. Cl.[6] ..... E01C 19/26; A01B 23/06; A01B 5/00

[52] U.S. Cl. ..... 404/128; 172/567; 172/599

[58] Field of Search ..... 404/128; 172/567, 579, 172/584, 582, 599-605

[56] References Cited

U.S. PATENT DOCUMENTS

| | | |
|---|---|---|
| 100,231 | 7/1806 | Knowlton . |
| 411,650 | 9/1889 | Drader . |
| 689,574 | 12/1901 | Burdick et al. . |
| 1,074,502 | 9/1913 | Kanyo . |
| 1,712,815 | 5/1929 | Dwyer . |
| 2,347,335 | 4/1944 | Sousa . |
| 2,477,001 | 7/1949 | Pacheo, Jr. . |
| 2,588,709 | 3/1952 | Elliott . |
| 2,623,341 | 12/1952 | Evans et al. . |
| 2,788,728 | 4/1957 | Gray . |
| 4,607,706 | 8/1986 | Raynor . |

FOREIGN PATENT DOCUMENTS

| | | |
|---|---|---|
| 100231 | 7/1906 | Canada . |
| 519569 | 12/1955 | Canada . |
| 521692 | 2/1956 | Canada . |
| 632884 | of 1961 | Canada . |
| 864820 | 3/1971 | Canada . |

OTHER PUBLICATIONS

Rome Industries brochures/specifications, Cedartown, Georgia, U.S.A. 1975-1982.

*Primary Examiner*—Stephen C. Pellegrino
*Assistant Examiner*—Nancy Mulcare
*Attorney, Agent, or Firm*—Dorsey & Whitney

[57] ABSTRACT

A surface conditioning attachment for a motor grader or the like for use in maintenance operations on gravel roadways comprises a gang of harrow disks carried on a support shaft, there being a support structure for deploying said disks laterally outwardly of the grader at an angle to the direction of travel and with the concave sides of the disks facing forwardly. In use the gang of disks engages the surface of the road shoulder and cuts up and moves gravel and vegetation thereon laterally towards the roadway.

12 Claims, 3 Drawing Sheets

ROADWAY CONDITIONING APPARATUS

Matter enclosed in heavy brackets [ ] appears in the original patent but forms no part of this reissue specification; matter printed in italics indicates the additions made by reissue.

This application is a *reissue of application Ser. No. 07/872,145, now U.S. Pat. No. 5,197,820, which was a* continuation of application Ser. No. 07/639,350, filed Jan. 10, 1991, now U.S. Pat. No. 5,108,221.

BACKGROUND OF THE INVENTION a. Field of the Invention

This invention relates to a new or improved surface conditioning attachment for use with roadway maintenance equipment, in particular in maintenance operations on gravel *or nonpaved* roadways.

b. Description of the Prior Art

A major problem in maintaining a gravel road is that of trying to prevent the gravel from being lost into the ditches bordering the road or from accumulating on the road shoulder in the form of a ridge or berm. It is also important to control the spreading of vegetation such as grass and weeds on the road shoulders so that it does not creep onto the road surface.

With constant maintenance by means of a motor grader or the like, a ridge or berm of displaced gravel and like material is produced on the edge of the road. This berm prevents water from running freely off the side of the road, and as a result cuts are formed by escaping water, and gravel is lost in these cuts.

The present methods used to control these problems involve the use of herbicides for controlling growth of vegetation on road surfaces. However this entails a problem since the herbicides cannot be contained because of the leeching which occurs, and as a result too much vegetation is killed which causes spreading of the roadway. Additionally, herbicides cannot be used near water ways.

Vegetation growth on gravel road shoulders can also be controlled by various types of mulchers. However mulching requires specialized equipment, and although mulching will cut up the vegetation and mix it with the gravel, this is only a temporary solution, and is a costly one to repeat.

Accordingly, the most common approach applied is to periodicaly attempt to retrive the road gravel from the shoulders using a motor grader, but this solution also causes grass and sod to be moved onto the roadway by the grader. Such material will not spread and therefore lumps are left at the side of the road. The presence of lumps of sod, grass and loose gravel on the side of the road in turn causes vehicle operators to steer well clear of the road shoulders, and this in turn raises the risk of collisions between vehicles travelling in opposite directions.

SUMMARY OF THE INVENTION

The present invention provides a surface conditioning attachment for use in surface maintenance operations on a gravel roadway, said attachment comprising a gang of dished harrow disks rotatably supported at uniform spacing on a support shaft, and a support structure carrying said support shaft, means for mounting said support structure on [the right-hand side of] a carrying *or pulling* vehicle to deploy the shaft generally parallel to the surface to be conditioned and oblique to the direction of travel of the vehicle, the concave sides of the disks [preferably] being oriented towards the front and the shaft diverging from the vehicle in the rearwards direction, such that in use the apparatus will engage and condition a swath of roadway [to the right outboard side of the vehicle] surface material from said swath being conditioned and displaced in the direction of the middle of the roadway.

The attachment can be mounted on a motor grader or other road conditioning vehicle, and [since it mounts on the right side of the vehicle,] the vehicle can progress in normal fashion along the right-hand side of the road, and therefore does not present a hazard to oncoming traffic.

The support [shaft] *structure* carrying the disks is attached at its forward end to the vehicle, its oblique arrangement being maintained by a brace member extending from the rear of the [vehicle] *support structure* to the rear mounting of the shaft, this brace member preferably being adjustable in length so that the angle between the shaft and the fore-and-aft direction of the vehicle can readily be adjusted in the range between about 15 and 35 degrees. A preferred angle is about 25 degrees. Preferably means are provided for raising the attachment from the ground level and pivoting it inwardly toards the vehicle to a retracted position for transport.

BRIEF DESCRIPTION OF THE DRAWINGS

The invention will further be described, by way of example only, with reference to the accompanying drawings wherein.

DESCRIPTION OF THE PREFERRED EMBODIMENT

Figure 1:
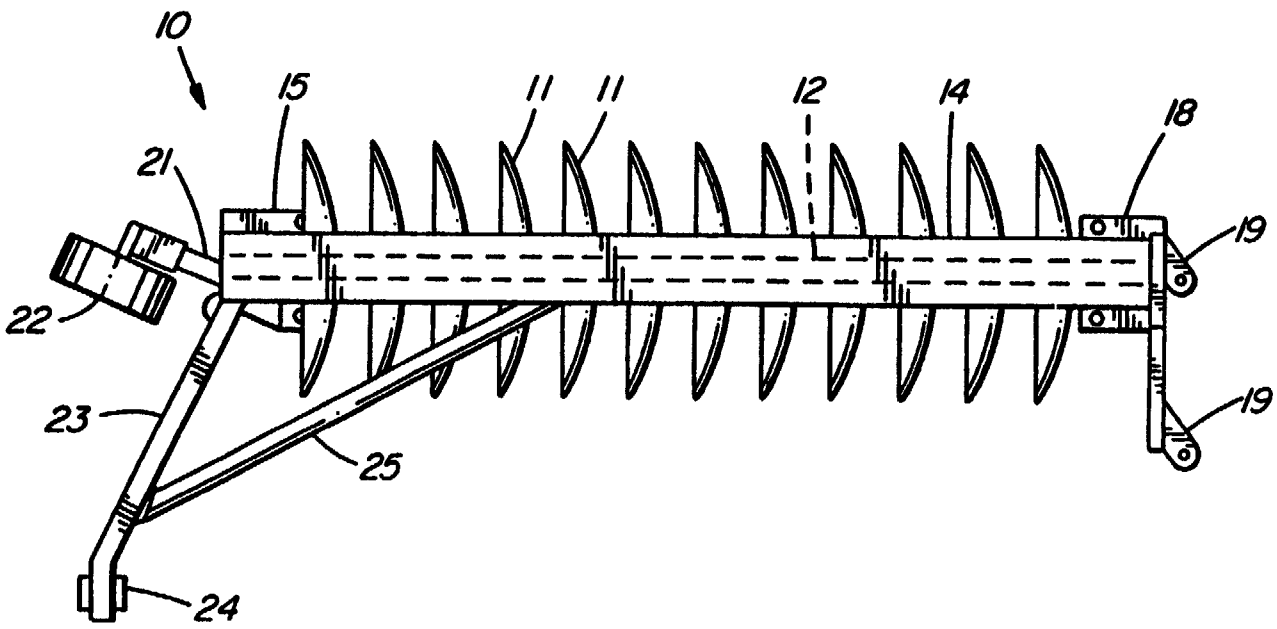
FIG. 1 is a plan view of the attachment.
Figure 2:
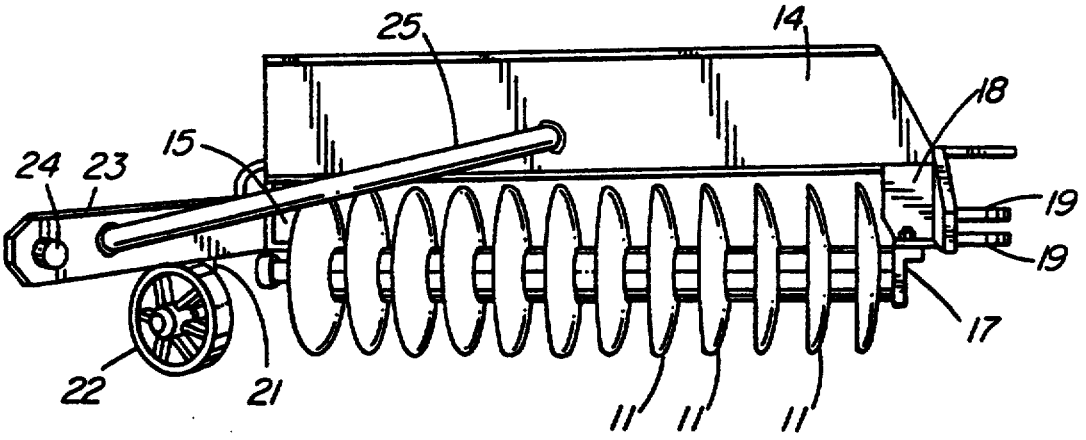
FIG. 2 is a side perspective view thereof.
Figure 3:
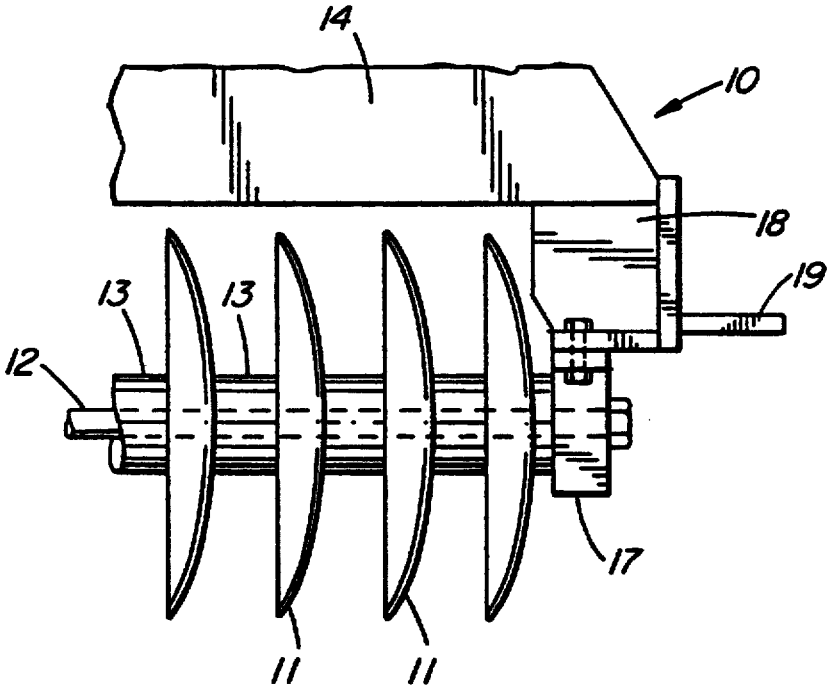
FIG. 3 is an enlarged fragmentary side view of the rear portion of the attachment.

Referring to FIGS. 1 to 3, the attachment generally indicated at 10 comprises a gang of uniform, parallel, concavely dished harrow disks 11 rotatably mounted on a shaft 12, the individual disks being uniformly spaced by means of annular spacers 13 arranged between them. The shaft 12 extends parallel to and spaced below a frame formed by a steel I-beam 14. The forward end of the shaft is rotatably received in a bearing (not shown) in a bracket 15 which depends from the front end of the I-beam 14, and the rearward end of the shaft is supported in a thrust bearing 17 in a bracket 18 depending from the rearward end of the beam 14. The bracket 18 also supports two laterally spaced mounting lugs 19.

The forward bracket 15 also supports a downwardly angulated arm 21 the lower end of which supports a ground wheel 22 rotatable on a horizontal axis.

Figure 4:
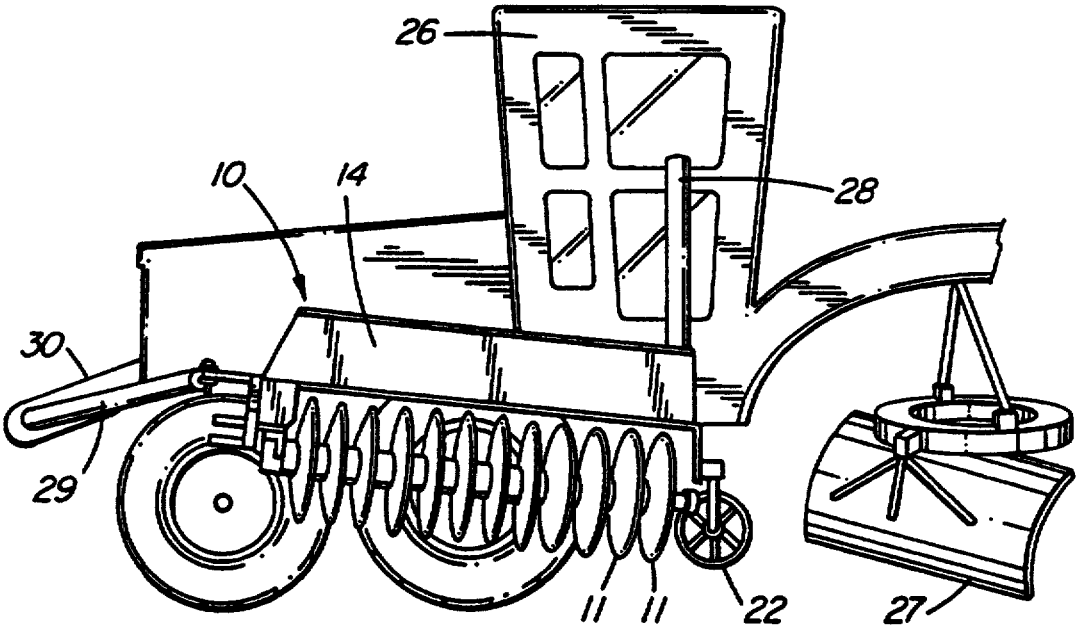
FIG. 4 is a side perspective view of the attachment mounted on a motor grader.

An attaching arm 23 extends angularly from the front bracket 15, and carries at its free end a suitable means for attachment to a motor grader or like vehicle, the attachment means here being show as a swivel ball attachment 24. An angulated strut 25 is attached at its ends in suitable manner, as by welding, to both the arm 23 and the beam 14 to maintain these elements in the predetermined angular relationship shown in FIG. 1. In use, the attachment is mounted on a suitable vehicle such as a motor grader 26 (as shown in FIG. 4). The attachment is mounted on the right-hand outboard side of the motor grader to the rear of the mold board blade 27. Specifically, the swivel ball connector is attached to the lower end of the snow plough mast 28 that extends vertically at the side of the motor grader, so that the attachment end can be raised or lowered on this mast to position it at the desired height. The rear end of the attachment 10 is supported by a brace 29 one end of which is pivoted to a mounting 30 on the grader, and the other end of which is pivoted to one of the lugs 19 on the bracket 16. By virtue of this mounting, the attachment can be swung from the horizontal operating position, wherein the gang of disks 11 lie generally horizontally in contact with the ground, and the retracted position as shown in FIG. 4 wherein the attachment is swung upwardly and inwardly towards the side of the grader for transportation. A powered cable means (not shown) is provided on the mast 28 or on any other suitable part of the grader to effect raising of the attachment when desired.

Figure 5:
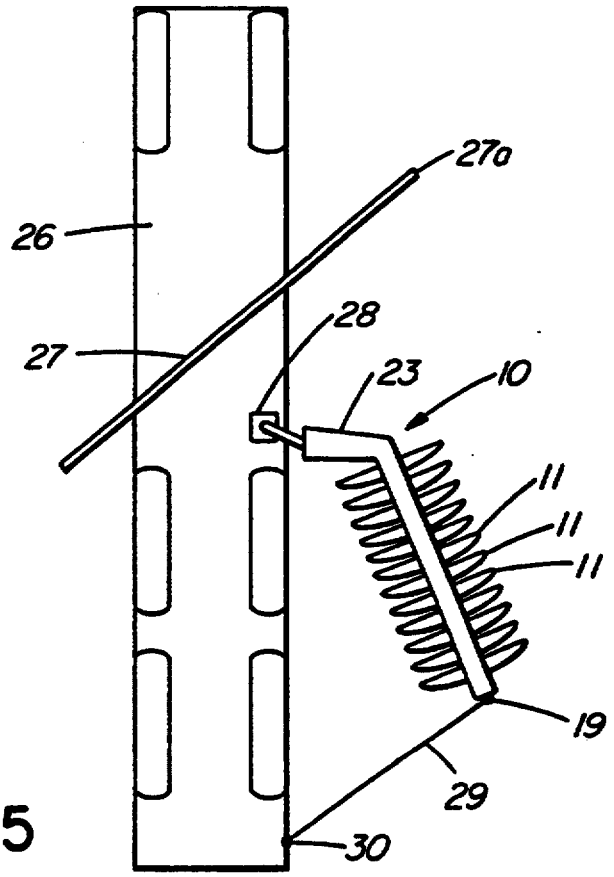
FIG. 5 is a schematic plan view illustrating the attachment in use.

In use, the grader hydraulic controls are manipulated to lower the mounting point at the swivel ball 24 downwardly until the ground wheel 22 of the attachment rests upon the ground. Thereafter the beam 14 is allowed to swing downwardly and outwardly until the disks 11 rest upon the ground surface to be treated. In this configuration the attachment of the will be deployed substantially as illustrated in FIG. 5 extending obliquely to the fore-and-aft direction by a selected angle (as illustrated, about 25 degrees), being supported in this position by the brace 29. The angular orientation of the attachment can be varied by connecting the brace to one or other of the mounting lugs 19. Alternatively the brace may be designed to be of adjustable length to provide a continuous range of angular adjustment from about 15° to 35°.

As will be seen, the leading of the disk gang 11 is spaced laterally from the side of the motor grader by the attaching arm 23, so that the first of the disks 11 registers with the right edge of the mold board blade 27, it being noted that the disks are oriented with their concave sides facing frontwards. The angle between the orientation of the disk gang 11 and the fore-and-aft direction can be varied from the example of 25 degrees that is shown, this variation being made in accordance with the desired amount of cut that each disk is to make, and also of the swath that is conditioned by the attachment as the motor grader advances.

The attachment is used in combination with the normal grading operation of the road which is carried out using the mold board blade 27. As the motor grader advances the disks 11 are engaged by the surface of the shoulder, cutting a swath of approximately 32 inches, and moving the gravel and newly mulched material inwards, i.e. towards the center of the road. The amount by which the cut material is moved laterally inwardly will vary according to the orientation of the disk gang 11 to the fore-and-aft direction, and also according to the speed of advance in the forward direction. The faster the speed the further the cut material will be displaced laterally. Preferably these conditions are set so that the newly mulched material is moved laterally by from 12 to 16 inches. During this operation, the disks are of course turned by interaction with this material, the disks turning in the clockwise sense as viewed from the rear end of the shaft 12. The material cut by the disk gang is turned and mulched, and left to dry so that on a subsequent pass of the grader over the same path, the previously cut and now dried material is displaced inwardly by a further 12 to 16 inches so that the outermost 12 to 16 inches of the swath is swept clean. On subsequent passes the entire 32 inch swath will be swept clean, effectively retrieving surface gravel from the shoulder of the road and distributing it back onto the roadway as well as preventing berm buildup on the shoulder and removing vegetation.

The [retriever] *disk* attachment is of sufficient mass that the disks will cut into the surface of the road shoulder rather than merely slide over it, and readily accommodates to the inclination of the road or shoulder surface over which the attachment is drawn, even if this inclination differs from that of the surface beneath the [grader] *vehicle*. This is because of the pivotal mounting of the attachment on the [grader] *vehicle*.

Regular use of the [retriever] *disk* attachment eliminates the buildup of sod and loose gravel on the shoulder of the roadway and spreads reusable material such as gravel back onto the roadway.

The attachment can of course be used independently of its use on a motor grader as described above, and is readily adaptable for mounting on other road vehicles such as trucks, snow ploughs and the like.

The mount of the wheel 22 can be designed to provide for vertical adjustment of the wheel relative to the shaft 12, although since the lower side of the wheel should preferably be at the same level as the lower sides of the disks, generally adjustment will only be necessary to compensate for wear of the disks.

I claim:

1. A surface conditioning attachment for use in surface maintenance operations on a gravel roadway, said attachment comprising:

a gang of dished, harrow disks rotatably supported at uniform spacing on a support shaft;

a support structure carrying said support shaft;

means for mounting said support structure generally at the side of an associated carrying vehicle to deploy the shaft generally parallel to the surface to be conditioned, and oblique to the direction of travel of the vehicle so that said shaft diverges from the vehicle in a rearward direction *at an angle between said shaft and the fore-and -aft direction of the vehicle in the range of 15 to 35 degrees;* brace means extending between the associated vehicle and a portion of said support structure spaced from said vehicle, for thereby maintaining such shaft in said [generally] oblique orientation relative to the direction of travel of the vehicle;

said concave sides of said disks oriented toward the direction of travel of said associated vehicle and said attachment, such that in use the apparatus will engage and condition a swath of roadway to the outboard side of the associated vehicle, with surface material from said swath being conditioned and displaced in the direction of the middle of the roadway.

2. The surface conditioning apparatus in accordance with claim 1, wherein said brace means is of an adjustable length to permit the orientation of said support structure, relative to said vehicle, to be selective varied.

3. The surface conditioning attachment in accordance with claim 1, including ground engaging means carried on the attachment in the region of the forwardly positioned end of said shaft, said ground engaging means being positioned to support said shaft so that said disks cut into the ground that is to be broken up and moved inward.

4. A surface conditioning attachment for use in surface maintenance operations on a gravel roadway, said attachment comprising:

a gang of dished, harrow disks rotatably supported at uniform spacing on a support shaft;

a support structure carrying said support shaft; and means for attaching said support structure on an associated carrying vehicle to deploy the shaft generally parallel to the surface to be conditioned, and for maintaining said support structure oblique to the direction of travel of the vehicle so that said shaft diverges from the vehicle in a rearward direction *at an angle between said shaft and the fore-and-aft direction of the vehicle in the range of 15 to 35 degrees ;* said attaching means including mounting means for pivotally mounting said support structure so that said support structure can be raised and lowered relative to said associated carrying vehicle;

said concave sides of said disks oriented toward the direction of travel of said associated vehicle and said attachment, such that in use, the apparatus will engage and condition a swath of roadway, with surface material from said swath being conditioned and displaced in the direction of the middle of the roadway.

5. The surface conditioning apparatus of claim 4, wherein said attaching means further includes brace means extending between the associated vehicle and a portion of said support structure spaced from said vehicle, for thereby maintaining said shaft in said generally oblique orientation relative to the direction of travel of the vehicle.

6. The surface conditioning attachment of claim 4, including:

ground engaging means carried on the attachment in the region of the forwardly positioned end of said shaft, said ground engaging means being positioned to support said shaft so that the disks cut into the ground that is to be broken up and moved inward.

7. The surface conditioning attachment of claim 5, including:

ground engaging means carried on the attachment in the region of the forwardly positioned end of said shaft, said ground engaging means being positioned to support said shaft so that the disks cut into the ground that is to be broken up and moved inward.

*8. A surface conditioning attachment for use in association with a carrying vehicle in surface maintenance operations on a nonpaved road surface, said attachment comprising:*

*a gang of dished harrow disks rotatably supported on and uniformly spaced along a support shaft, said support shaft having a forward end and a rear end and said harrow disks being oriented with the concave sides thereof facing said forward end;*

*a support structure carrying said support shaft; and*

*means for mounting said support structure to said associated carrying vehicle to deploy the shaft generally parallel to the surface to be conditioned and oblique to the direction of travel of the vehicle with the shaft diverging rewardly at an angle of between 15 and 35 degrees to said direction of travel.*

*9. The surface conditioning apparatus of claim 8, wherein the support structure is deployed to the outboard side of the associated carrying vehicle.*

*10. The surface conditioning apparatus of claim 9 wherein the support structure is deployed to deploy the shaft at angle of about 25 degrees to said direction of travel.*

*11. The surface conditioning apparatus of claim 10, wherein said means for mounting said support structure to said associated carrying vehicle further includes brace means extending between the associated vehicle and a portion of said support structure spaced from said vehicle for thereby maintaining said shaft in said generally oblique orientation relative to the direction of travel of the vehicle.*

*12. The surface conditioning apparatus of claim 11, wherein said brace means is adjustable in length to thereby adjust the angle of said shaft with respect to the direction of travel or the vehicle.*

* * * * *

UNITED STATES PATENT AND TRADEMARK OFFICE

CERTIFICATE OF CORRECTION

PATENT NO. : Re. 34,860

DATED : February 14, 1995

INVENTOR(S) : Eric T. Skibsted

It is certified that error appears in the above-indentified patent and that said Letters Patent is hereby corrected as shown below:

Column 1, line 49, change "periodicaly" to -- periodically --.

Column 2, line 18, after the word "maintained" insert -- *in the range between about 15 and 35 degrees to the direction of travel. Such oblique arrangement may be maintained* --.

Column 2, line 19, change "[vehicle] *support structure*" to -- vehicle --.

Column 2, line 27, change "toards" to -- towards --.

Column 3, line 27, delete "of the".

Column 3, line 37, after "leading" insert -- end --.

Column 3, line 47, after "also" insert -- of course this variation changing the overall width --.

Column 6, line 31, after "at" insert -- an --.

Signed and Sealed this

Ninth Day of May, 1995

Bruce Lehman

*Attest:*

BRUCE LEHMAN

*Attesting Officer*

*Commissioner of Patents and Trademarks*